United States Patent [19]

Bertram

[11] 4,245,297
[45] Jan. 13, 1981

[54] POSITIONING CONTROL SYSTEM

[75] Inventor: Sidney Bertram, Los Angeles, Calif.

[73] Assignee: Bunker Ramo Corporation, Oak Brook, Ill.

[21] Appl. No.: 385,252

[22] Filed: Jul. 27, 1964

[51] Int. Cl.$^3$ .................................................. G05B 19/21
[52] U.S. Cl. ............................. 364/118; 235/92 MP; 318/601; 364/474
[58] Field of Search .................... 328/150; 340/347; 235/151.11, 92 MP; 318/20.330, 20.748, 601; 364/559, 474, 118

[56] References Cited

U.S. PATENT DOCUMENTS

| | | | |
|---|---|---|---|
| 3,098,995 | 7/1963 | Mundt | 340/146.2 |
| 3,112,412 | 11/1963 | Dyer | 328/150 |
| 3,375,354 | 3/1968 | McGarrell | 235/92 MP |
| 3,508,251 | 4/1970 | Kelling | 235/92 MP |

Primary Examiner—Howard A. Birmiel
Attorney, Agent, or Firm—F. M. Arbuckle

[57] ABSTRACT

A mechanical element positioning control system. Position measuring means supply actual position and a computer supplies desired position as the least significant 11 bits of an 18 bit signal to corresponding digital to analog units, each comprising an 11 bit register and an 11 bit digital to analog converter. A differential amplifier compares the outputs of the digital to analog converters and generates a position error signal. A threshold circuit operates to complement the most significant bit of the D/A registers when exceeding of a maximum allowable analog error occurs. A servo system responsive to the position error signal positions the mechanical element to eliminate difference between desired and actual position. By eliminating the seven most significant bits representing desired and actual position, the total range is divided into $2^7$ separate fields so that D/A units of practical accuracy may be employed to make feasible a positioning control system of required accuracy and range.

9 Claims, 5 Drawing Figures

POSITIONING CONTROL SYSTEM

The Invention herein described was made in the course of or under a contract or subcontract thereunder, with U.S. Army Engineer Research and Development Laboratories.

The present invention relates to a positioning control system and more particularly, to a system wherein digital information is converted to analog signals for controlling the physical position of a subsystem.

In various scientific and industrial applications it is important to be able to automatically control the position of a subsystem, whose relationship with other parts or components of the system is required to be a function of various parameters. In some instances the accurate positioning of such a system may control the ultimate usefulness of the system. For example, in automatic machine tooling it is important to control precisely the position of the tool (or the part being machined with respect to the tool) so that the machined part may attain the proper configuration and dimensions. Similar requirements of controlling the position of an element in response to automatically produced or computed data also exist in other fields of science and technology. In some automatic systems the data related to the position of an element is computed in, or supplied by, a high speed computer whose output is in the form of digital signals. Such signals are then converted into related analog signals which are used to actually position the element. The degree or extent of the required signal conversion is, of course, dependent on the over-all range of positions of the element with respect to the required accuracy of positioning. For example, if the range of positions of the element is 1,000,000 microns (1 meter) and the desired accuracy is 1 micron, it is apparent that binary digital signals having 20 bits need be converted to related analog signals in order to position the element with the desired accuracy. An analog-to-digital conversion of electrical information signals of 20 bits accuracy is quite difficult to attain but very necessary in terms of practical mechanical accuracies. This problem is further complicated in systems where the computed position of the element is compared with the actual position thereof in order to develop error servoing signals to be used in accurately positioning the element. In such a system two sets of signals of 20 bits each have to be converted from digital to analog signals thus increasing the complexity of signal conversion. According to the present invention a system is provided which overcomes such signal conversion problems by eliminating the need for 20-bit digital-to-analog conversion, yet enables the positioning of an element with a corresponding accuracy.

The present invention is based on automatically positioning an element by comparing only the least significant portions of the sets of signals indicative of the digitally expressed desired and actual positions of the element. The difference between the two sets of signals of minimal accuracy is then used as an error servoing signal to adjust the actual position of the element to be substantially equal to the desired position. Additional means are provided to control the operation of the system so that no ambiguity results in the positioning of the element even though the most significant portions of the two sets of signals indicative of the desired and actual positions of the element are not used in the positioning control system disclosed herein.

For a more complete understanding of the present invention, the teachings disclosed herein will be described in connection with a specific example, it being clear, however, that the invention is not limited thereto and that the example is presented for explanatory purposes only. The system of the present invention may be employed in conjunction with a mechanical element, hereinafter also referred to as a table, whose desired position is to be automatically controlled within an accuracy or resolution of two microns over a total range of control of 500,000 microns (about 20 inches), i.e., within 18 bit accuracy. Data indicating the actual position of the table is provided by a position measuring device, which provides a two-bit gray code used to operate a reversible binary counter which provides signals indicative of the table position. The desired position of the table is calculated and automatically supplied by a digital computer in the form of another binary signal. Since it is desired to position the element with an 18 bit accuracy, the two binary signals from the computer and the counter should contain 18 bits. However, as previously stated, converting an 18 bit digital signal, representative of the complete positioning range, to an analog signal is quite complex and virtually prohibitive both technically and cost-wise. Therefore, according to the present invention, only a number of bits whose signals represent a control range of at least twice a designed allowable maximum range representing the difference in positions between the desired and actual positions of the table need be converted. Hereinafter, the term "position difference" will refer to the difference in position between the actual and desired positions of the table or element. In the present example, it is assumed that the position difference will not exceed 1500 microns. Therefore, only the eleven least significant bits of the two binary signals need be converted, with a total range of 2048 digital units, related to 4096 microns, which is more than twice the number of microns of maximum position difference. However, by converting only eleven out of eighteen bits and ignoring the seven most significant bits, the total range of control is in essence divided into 128, i.e., $2^7$, fields or subranges. Therefore, means must be provided to produce additional signals indicative of the changeover of the position of the table from one field to another in order to avoid any ambiguity in the positioning of the table. To avoid this ambiguity, additional circuitry, as will be explained hereinafter in detail, is incorporated in the system of the present invention so that analog signals produced by converting only eleven bits of digital signals are sufficient to control the table's position, even though the signals indicative of the total range of the table's position consist of eighteen bits.

The novel features which are believed to be characteristic of the invention, together with other features and advantages thereof, will be better understood from the following description, taken in conjunction with the accompanying drawings, in which.

For a better understanding of the present invention, reference will first be made to a prior art positioning system, assuming that electronic digital-to-analog (D/A) converters are available with a range sufficient to produce analog signals so as to position an element over any selected range within a desired accuracy. So assuming, reference is now made to FIG. 1 wherein is shown a mechanical element 11, whose position is to be accurately controlled over a specific range. The precise actual position of the mechanical element 11, which may be a specific part of a larger mechanical system or a mechanical tool, is measured by a position measuring system 12, capable of providing an output signal in digital form which indicates the actual position of the element 11. The number of bits of the output signal and the number of units of length indicated by each digit of the output signal of the measuring system 12 will depend on the total range over which the element 11 is to be positioned and the desired resolution of the system, respectively. The desired resolution, hereinafter also referred to as the resolution element, refers to the accuracy within which the element 11 is to be positioned. In the example described herein, each resolution element is two microns, and since the total range of control is 500,000 microns, the number of binary bits of the output signal of the measuring system 12 should be at least eighteen, since 500,000/2 is greater than $2^{17}$ but smaller than $2^{18}$. The digital output signal of eighteen bits of the system 12 is then supplied to a digital-to-analog (D/A) unit 13 having a range of eighteen bits. The output of the circuitry is an analog signal related to eighteen-bit digital input signal supplied thereto.

Figure 1:
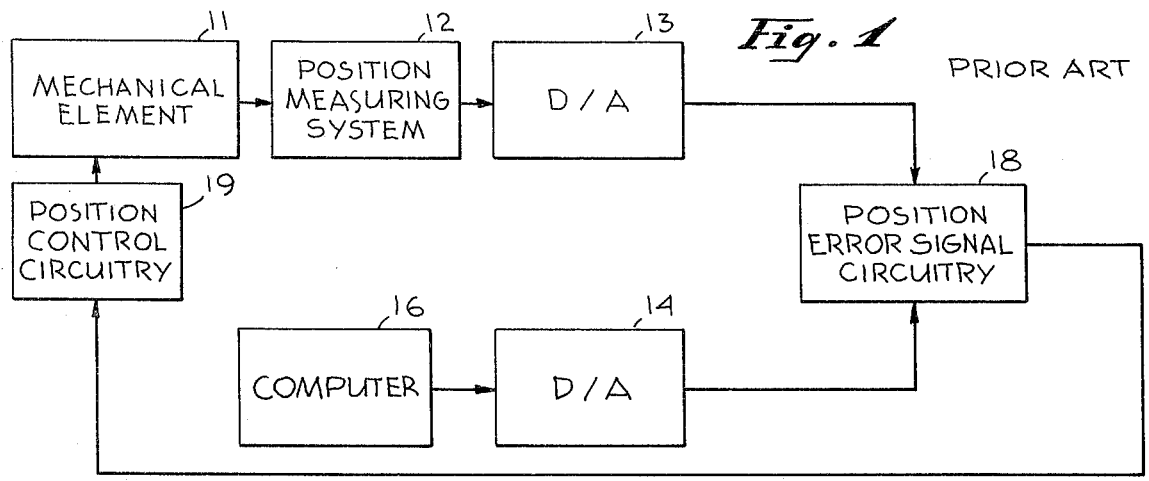
FIG. 1 is a block diagram of prior art apparatus useful in explaining the advantages of the present invention.

The arrangement shown in FIG. 1 further includes another eighteen-bit D/A unit 14, which produces an analog signal in response to an input signal of eighteen bits, indicative of the desired position of the element 11. The source of such an eighteen-bit signal may be a computer 16 or other circuitry wherein the desired position of the element 11 is determined and expressed as an eighteen-bit digital signal. The two analog output signals of the D/A units 13 and 14 are supplied to position error signal circuitry 18, which compares the two analog signals and produces an ouput signal only when there is a difference between the desired and actual positions of the element 11, as indicated by a difference between the two analog output signals of the units 14 & 13. The output signal of the circuitry 18 is in turn supplied to a position control circuit 19 such as a servo system, which moves or positions the element 11 so as to substantially eliminate any difference between the actual position thereof and its desired position as indicated by the output signal of the computer 16.

From the foregoing description, it is seen that the arrangement shown in FIG. 1 is adapted to control the element 11 over a range which is 250,000 times the length of the smallest resolution element by employing, in addition to other circuits, two eighteen-bit D/A converting units operating from desired position and actual position signals. However, as pointed out above, the implementation of eighteen-bit electronic D/A converters is quite difficult and probably beyond the state of the art. It is to eliminate such difficulties that the present invention provides a system which, though capable of providing for a positioning system having a range-to-resolution-element ratio of 250,000:1, requires D/A converters of considerably less than eighteen-bit range. Indeed, the number of bits required in the D/A converters depends only on the maximum allowable position difference that may occur between the desired and actual positions of the element. For example, if the maximum allowable position difference is 1500 microns, represented by a digital signal of 750, which is less than $2^{10}$ but more than $2^9$, D/A converters of eleven bits capacity (one greater than ten, for safety purposes) are required. On the other hand, if the maximum allowable position difference were only 400 microns, or a digital signal difference of 200, which is less than $2^8$ but more than $2^7$, D/A converters of nine-bit capacity (one greater than eight) would be sufficient. Generally stated, according to the teachings disclosed herein, the bit capacity of the D/A converters should be such that the maximum digital signals therein should be at least twice as great as the digital signals representing the maximum allowable position difference.

Figure 2:
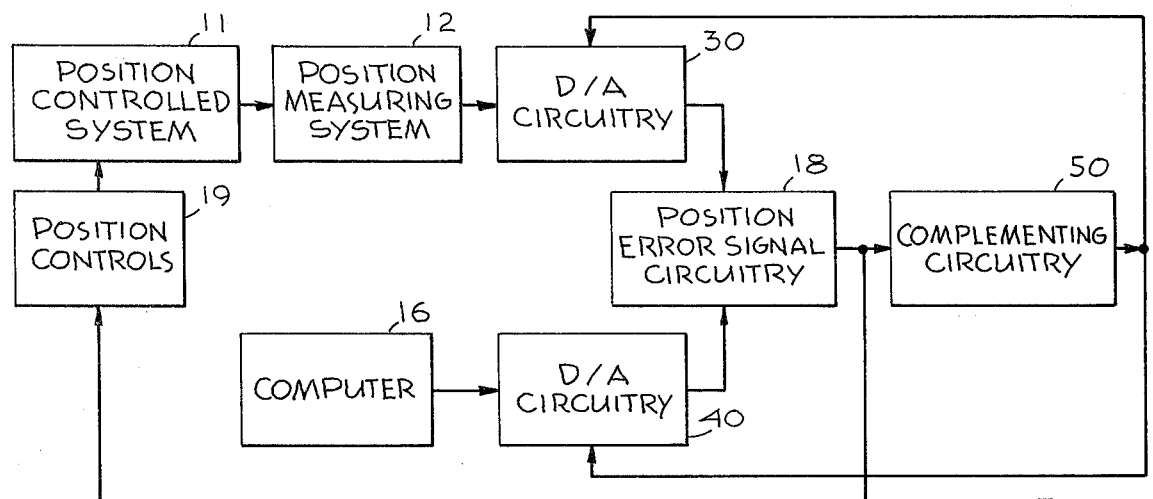
FIG. 2 is a block diagram of an embodiment of the present invention.
Figure 3:
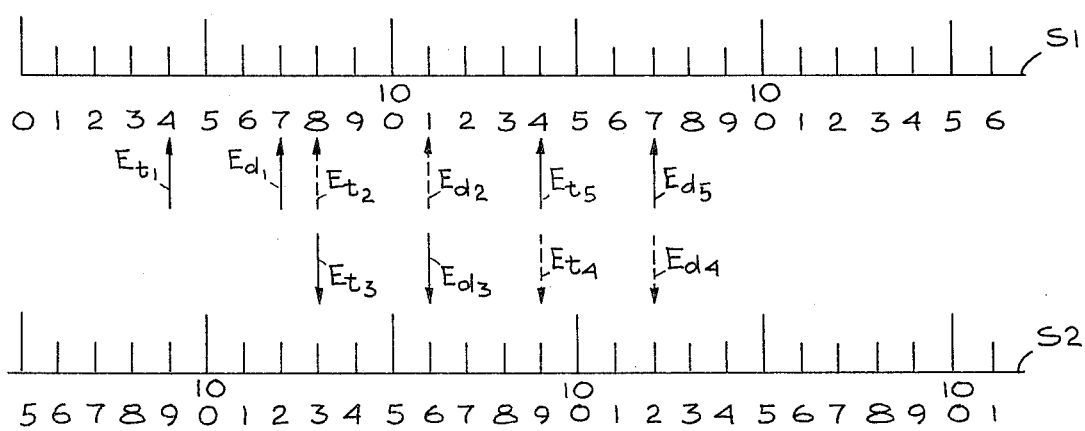
FIG. 3 is a diagram useful in explaining the novel features of the invention.

Reference is now made to FIG. 2 which represents in block diagram a positioning system constructed according to the present invention, which differs from that decribed in connection with FIG. 1 in that the eighteen-bit D/A converting units 13 and 14 (FIG. 1) are replaced by D/A converting units 30 and 40. Furthermore, the position error output signal of the circuitry 18, besides being supplied to the position control circuitry 19, is also supplied to complementing circuitry 50, whose output is in turn connected to the D/A units 30 and 40. In the present example, the maximum allowable position difference has been arbitrarily selected to be 1638 microns, which may be represented by a digital signal of 819. Therefore, each of the units 30 and 40 has an eleven-bit capacity, since $2^{11}$ equals 2048 which is more than twice as great as 819. However, by eliminating the seven most significant bits of the digital signals representing the position of the system 11 and the desired position from the computer 16 (bits twelve through eighteen), the total range of 500,000 microns is in essence divided into 128, i.e., $2^7$ separate fields, setting up a periodic measuring system in which the D/A units 30 and 40 operate over their full ranges in each field. This may better be explained by referring to FIG. 3, wherein a scale S1 is shown with numbers from 0 to 10 representing the analog outputs of each of the D/A units 30 and 40 for a given position of the element 11. The numbers 0 through 10, hereinafter also referred to as 0 through 10 volts, were chosen for explanatory purposes only. They are related to digital input signals to the D/A units of 0 to 2048 units. Assume that at a first instance in time the digital input signals of a magnitude of 1434 are supplied to the D/A unit 40 from the computer 16 resulting in an analog output signal $E_d$ of 7 volts ($7 \approx 1434/2048 \times 10$) as indicated by an arrow $E_{d1}$. At the same time digital input signals of a magnitude of 810 from the position measuring system 12 (FIG. 2) indicating the actual position of the system 11 are supplied to the D/A unit 30 resulting in an output signal $E_t$ of 4 volts ($4 \approx 819/2048 \times 10$) as indicated by an arrow $E_{t1}$. It is apparent that the position error signal is ($E_d - E_t$) equalling 3 volts ($3 = 7 - 4$). Now assume that at a second instance in time the digital signals indicative of both the desired and actual positions of the system 11 increase by 819, less than $\frac{1}{2}$ the digital range of each of the D/A units 30 and 40. Since the digital signals to both D/A units increase equally, the error signal should remain 3 volts. The digital input of the D/A unit 30 will increase by 819 from 819 to 1638 resulting in an analog output signal of 8 volts, as indicated by an arrow $E_{t2}$. ($8 = 1638/2048 \times 10$). The digital input of the D/A unit 40 on the other hand will attempt to increase by 819 from 1434 to 2253. Since the range of the digital D/A unit 30 is only 2048, it is apparent that the full count thereof will be exceeded by 205 (2253−2048=205), which corresponds to an analog output of 1 volt (1=205/2048×10), as indicated by an arrow $E_{d2}$. In such a case the error signal ($E_{d2}-E_{t2}$) equals −7 volts (1−8=−7), which materially differs from the expected analog error signal of plus 3 volts. This is, of course, due to the fact that digital signals in the seven most significant bits are not converted to related analog signals. However, as previously stated, the present invention does provide complementing circuitry (FIG. 2) which, when operating with the D/A units 30 and 40, avoids ambiguous and erroneous error signals.

Basically, the complementing circuitry 50 is energized by the output signal from the position error signal circuitry 18, which is the error signal hereinbefore referred to. As previously stated, the system is designed so that the maximum allowable error signal or difference between desired and actual positions of the system 11 is less than half of the total range of the D/A units 30 and 40. In accordance with such design criterion, the complementing circuitry 50 incorporates thresholding circuitry which is energized to produce an output signal only when the error signal exceeds half of the total analog range of the D/A units 30 and 40. Assuming each of the D/A units to be of M bits capacity, half its total analog range would be related to $2^{(M-1)}$. According to the design of the system, an output signal from the complementing circuitry 50 will occur only when the count in one of either of the D/A units has exceeded the full count thereof, as is the case in the foregoing example. In such a situation, the output signal of the circuitry 50 complements the most significant bit in each of the D/A units 30 and 40, thereby modifying the digital input thereto by ½ the total range. As a result, the analog output signal of each of the units 30 and 40 is modified by 5 volts, causing the two analog output signals corresponding to the desired and actual positions of the system 11 to change by ½ the total range of the D/A units 30 and 40. In the foregoing example, an error signal of minus 7 volts will cause both D/A units 30 and 40 to be complemented so that the signal indicative of the desired position of the system 11 will be equal to 6 volts rather than 1 volt, as shown by an arrow $E_{d3}$ relative to a scale S2 in FIG. 3. The signal indicative of the actual position of the system 11 will be equal to 3 volts rather than 8 volts as shown by an arrow $E_{t3}$. As a result, the error signal will be 6 volts minus 3 volts, equalling 3 volts as expected.

The effect of complementing the most significant bit of the units 30 and 40 may further be pointed out by another example. Assume that at some later time the actual position of the system is indicated by an analog signal of 9 volts as shown by an arrow $E_{t4}$, and that the desired position of the system 11 is indicated by an analog signal of 3 volts above that indicated by $E_{t4}$. However, since the maximum range of the D/A units is 10 volts, the desired position of the system 11 will be indicated by an analog signal of 2 volts rather than 12 volts, as shown by an error $E_{d4}$. However, unless these signals are complemented, the error signal will erroneously be 2 volts minus 9 volts equalling −7 volts, rather than +3 volts. Yet by complementing the signals, the desired and actual positions of the system 11 are indicated by signals of 7 and 4 volts, respectively, as indicated by arrows $E_{d5}$ and $E_{t5}$, respectively, resulting in an error signal of +3 volts as desired.

From the foregoing it is seen that even though the seven most significant bits of the eighteen-bit system have been eliminated, the system nevertheless provides error signals as if all eighteen bits of the digital positioning signals from the computer 16 (FIG. 2) and the position signals 12 were converted to analog signals. As previously stated, the number of bits to be converted depends on the maximum allowable difference in the eighteen-bit digital signals. If the difference does not exceed 750, which represents a position difference of 1500 microns, the number of required bits in the converters is 11, being one more than 10, since 750 is less than $2^{10}$ but greater than $2^9$.

Figure 4:
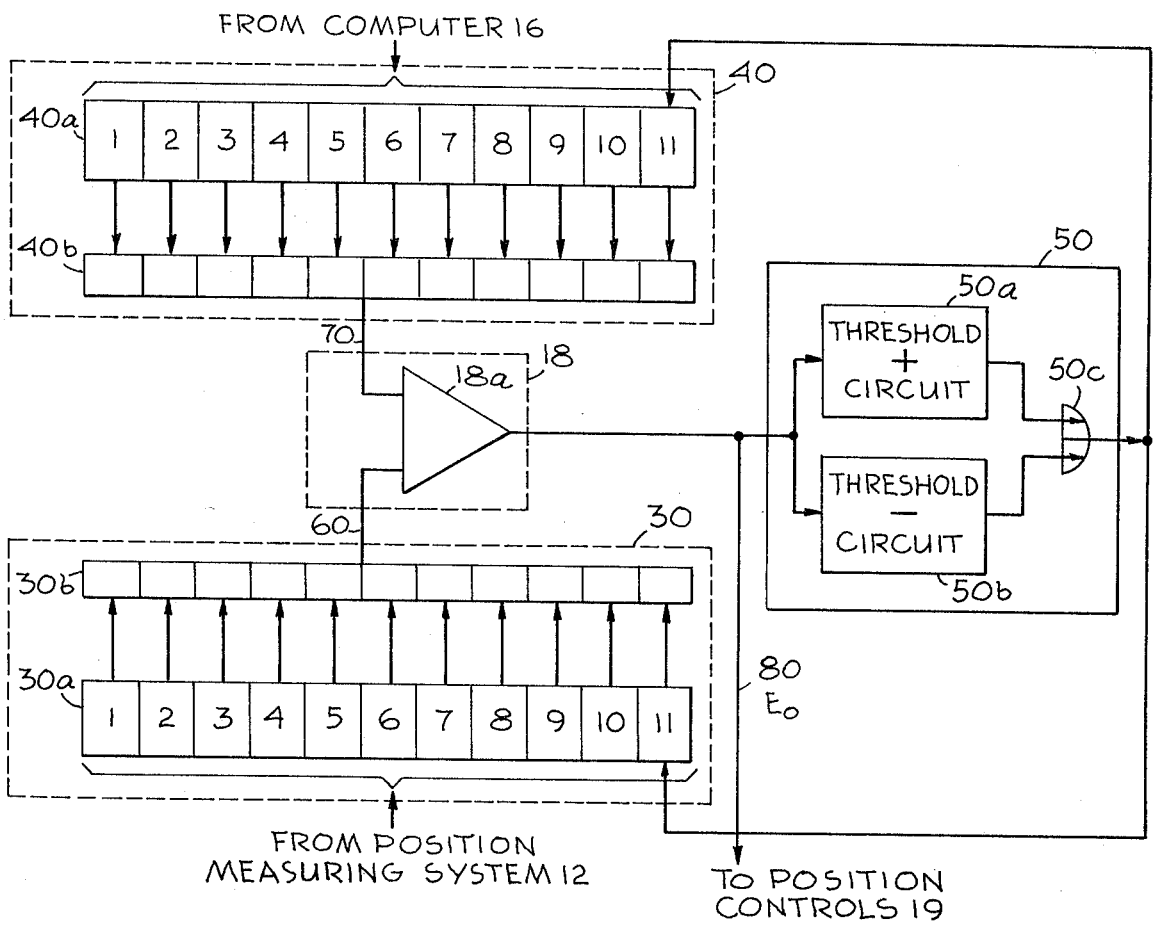
FIG. 4 is an expanded block diagram of a part of an embodiment of the invention.

Reference is now made to FIG. 4 wherein the D/A units 30 and 40 as well as the position error signal circuitry 18 and the complementing circuitry 50 are shown in greater detail. The D/A unit 30 comprises an 11-bit register 30a, which is supplied with digital signals representing the 11 least significant bits of the 18-bit digital signals which the position measuring system 12 provides as an indication of the actual position of the system 11 (FIG. 2). As shown in FIG. 4, the least significant bit within the 11 bits is marked 1 and the most significant bit is marked 11. Each of the 11 bits of the register 30a is connected to an 11-bit D/A converter 30b whose analog output $E_t$ is supplied to the circuitry 18 via a line designated 60. The D/A unit 40, which comprises an 11-bit register 40a and an 11-bit D/A converter 40b, is identical to the unit 30 hereinbefore described. The analog output $E_d$ of the D/A converter 40b is supplied to the circuitry 18 via a line designated 70. The position error signal circuitry 18 comprises a differential amplifier 18a which compares the two analog signals $E_t$ and $E_d$ supplied thereto via lines 60 and 70, respectively, and produces an analog difference signal $E_o$ on an output line 80. The analog difference $E_o$ may be thought of as the positioning error signal. Whenever the two analog signals $E_t$ and $E_d$ are equal, namely, when the system 11 is at the desired position, the analog difference $E_o$ is zero. However, whenever the two analog signals corresponding to the actual and desired positions of the systems differ, an error signal is produced which is supplied to the position control circuitry 19 (FIG. 2) so that the actual position of the system 11 may be adjusted to the desired position. In the example used herein, the maximum allowable error is assumed to be 1500 microns or a digital signal of 750, resulting in a maximum allowable analog error signal of 3.66 volts, since 3.66=750/2048×10. Thus it is seen that the maximum allowable analog error signal is less than one-half of the maximum analog output of either D/A converter 30b or 40b, which has previously been explained to be 10 volts. In order to provide for some design tolerances, the complementing circuitry 50 is adjusted to produce an output signal only when the analog error signal supplied thereto is equal to or greater than 5 volts. This is accomplished by incorporating therein two threshold circuits 50a and 50b, such as Schmitt trigger circuits. The threshold circuit 50a, which is designated as a plus (+) threshold circuit, provides an output signal whenever the error signal $E_o$ is equal to or greater than plus 5 volts. Similarly the threshold circuit 50b, which is designated as a minus (−) threshold circuit, provides an output signal whenever the error signal $E_o$ is equal to or greater than minus 5 volts, namely $E_t$ is greater than $E_d$ by 5 volts or more.

The output lines of both circuits 50a and 50b are connected to an OR gate 50c so that the output signal of either threshold circuit causes the OR gate 50c to produce an output signal. This output signal is supplied to the most significant bit of each of the registers 30a and 40a, causing those bits to be complemented and change the output signals $E_t$ and $E_d$ by 5 volts, as indicated by comparing scales S1 and S2 of FIG. 3.

From the foregoing description, it is seen that as long as the actual error corresponds to an $E_o$ of less than 5 volts, which is one-half the maximum analog output range of the units 30 and 40, it is possible to complement the significant bit of each D/A unit and thereby prevent an erroneous error signal even though the full digital count of one of the D/A units has been exceeded.

Figure 5:
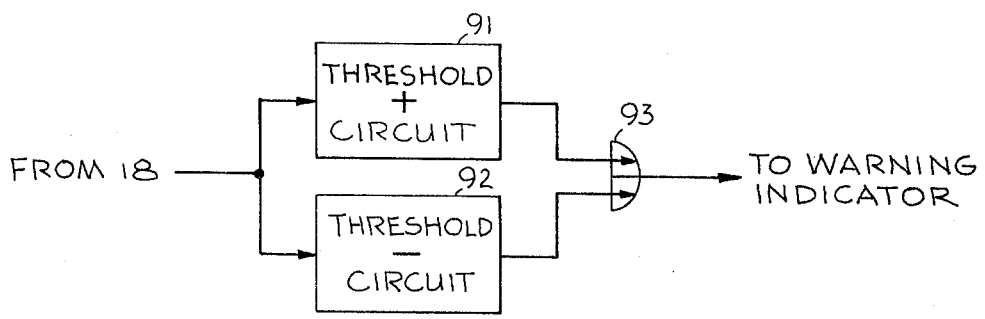
FIG. 5 is a block diagram of another embodiment of the present invention.

In another embodiment of the invention additional means are provided for producing a warning signal whenever the maximum allowable error signal indicative of the maximum allowable difference between the desired and actual positions of the system occurs. Such a warning signal may be used to alert an operator in an audio or visual manner that maximum design parameters of the system have been reached. Such means are shown in FIG. 5 to which reference is now made. As seen in FIG. 5, such alarm means comprise a plus (+) threshold circuit 91 and a minus (−) threshold circuit 92 (such as Schmitt trigger circuits), which are energized by the error signal $E_o$ from the position error signal circuitry 18. The output line of each of the circuits 91 and 92 is connected to an OR gate 93 which produces an output signal to be supplied to a warning indicator 94. The circuits 91 and 92 are adjusted to produce an output signal whenever the input signals thereto equal or exceed 3.66 volts which, as previously explained, is the magnitude of the maximum allowable analog error signal, representing the position difference between the desired and actual system positions. The circuit 91 produces an output signal when the error signal equals or exceeds plus (+) 3.66 volts, whereas the circuit 92 produces an output signal when the error signal equals or is greater than minus (−) 3.66 volts. The output signal of either circuit 91 or 92 energizes the OR gate 93 so that the warning indicator 94 is energized, thereby providing an indication that the maximum allowable difference in the desired and actual positions of the system 11 has been reached.

Summarizing briefly, the present invention provides for a positioning control system adapted to control the position of an element or system in response to digital signals in N bits without the need of converting all the N bits to related analog signals. The invention provides a system wherein only a part of the N digital bits are converted and yet insures that the generated positioning signals do not produce erroneous results. Furthermore, the teachings as disclosed herein indicate that the number of digital bits which need be converted is a function of the maximum allowable digital difference between the signals which represent the desired and actual positions of the system whose position is to be controlled by the invention disclosed herein.

It is understood that many changes and modifications may be made by one skilled in the art without departing from the true spirit and scope of the invention.

What is claimed is:

1. In a system wherein an element is positionable in response to a first set of positioning digital signals of N bit accuracy and wherein the position of the element is indicated by a second set of digital signals of N bit accuracy, the arrangement comprising:

first means for converting the positioning digital signals in M least significant bits of the first set of digital signals of N bit accuracy into a related first analog signal, M being smaller than N and selected so that digital signals converted therein are indicative of a position magnitude which is at least twice as great as a maximum allowable difference in the positions indicated by said first and second sets of digital signals;

second means for converting the digital signals in the M least significant bits of the second set of digital signals of N bit accuracy into a related second analog signal;

means for providing a first output signal substantially equal to the difference between said first and second analog signals;

means for providing a second output signal whenever the level of said first output signal is substantially equal to or greater than a predetermined threshold level which is at least equal to the level of a signal indicative of a position range corresponding to said maximum allowable difference in the positions indicated by said first and second sets of digital signals; and means responsive to said second output signal for complementing the most significant bit of each group of said M bits in said first and second means.

2. In a system wherein an element is positionable in response to a positioning signal which is a function of a first set of digital signals of N bit accuracy indicative of the desired position of the element and of a second set of digital signals of N bit accuracy indicative of the actual position of the element, the arrangement comprising:

first means for converting into a first analog signal the signals of M least significant bits of said first set of digital signals, M being a number smaller than N but large enough to permit converting of digital signals indicative of a position range which is at least twice as great as a maximum allowable difference between the desired position of said element as indicated by said first set of digital signals and the actual position thereof as indicated by said second set of digital signals;

second means for converting into a second analog signal the signals of M least significant bits of said second set of digital signals;

differencing means for producing a positioning error signal which is substantially equal to the difference between said first and second analog signals; and means including first thresholding means responsive to said positioning signal for complementing the most significant bit in said first and second means whenever the level of said positioning signal is greater than a threshold level corresponding to the level of an analog signal converted from digital signals equal to $2^{(M-1)}$.

3. The arrangement defined by claim 2 further including:

second thresholding means energized by said positioning error signal for producing a signal whenever the level of said positioning error signal is equal to or greater than the level of a signal corresponding to a position difference substantially equal to the maximum allowable position difference between the desired and actual positions of said element.

4. In a system wherein an element is positioned in response to a positioning error signal representing the difference between signals indicative of a desired position of said element and an actual position of said element, each of said signals being provided as digital signals of N binary bit accuracy, the arrangement comprising:
  first means for converting into a first analog signal the digital signals of M least significant bits of the signal indicative of the desired position of said element, M being smaller than N but large enough to permit converting digital signals indicative of a position range which is at least twice as great as a maximum allowable difference between the desired position of said element and the actual position thereof;
  second means for converting into a second analog signal the digital signals of the least significant M bits of the signal indicative of the actual position of said element;
  third means responsive to said first and second means for producing said positioning error signal which is substantially equal to the difference between said first and second analog signals;
  first threshold means responsive to said positioning error signal for providing a threshold signal whenever the absolute level of said positioning error signal exceeds the level of the predetermined threshold, said threshold having a value less than or equal to substantially half the digital value of $2^M$; and
  fourth means responsive to said threshold signal for complementing the most significant M bit in said first and second means, thereby modifying the signals representing the desired and the actual positions of said element by an amount equal to one-half the maximum value of said first and second analog signals.

5. The system defined by claim 4, further including:
  second threshold means responsive to said positioning error signal for producing a signal whenever the absolute level of said positioning error signal exceeds the level of a signal corresponding to a position range substantially equal to a maximum allowable difference between the desired and actual positions of said element.

6. A positioning system comprising:
  means including an element positionable within P units of length over a selected range of X units of length in response to a positioning signal supplied thereto which is a function of the difference between signals indicative of the desired and actual positions of said element, said difference in position not exceeding $2^{(M-1)}$ units of length, M being an integer;
  first means for automatically providing a first set of digital signals of N bit accuracy, N being larger than M, indicative of the desired position of said element over said range, each digit of said digital signal being indicative of a unit of the P units of length, M being selected so that X/P is greater than $2^{(M-1)}$, but equal to or smaller than $2^M$;
  second means for automatically providing a second set of digital signals of N bit accuracy indicative of the actual position of said element within said range;
  first converting means for converting the digital signals in M least significant bits of said first set of digital signals into a related first analog signal;
  second converting means for converting the digital signals in M least significant bits of said second set of digital signals into a related second analog signal;
  means including differencing means responsive to said first and second analog signals for providing said positioning signal whose amplitude is substantially equal to the amplitude difference between said first and second analog signals;
  first threshold means responsive to said positioning signal for producing a threshold output signal whenever the absolute amplitude of said positioning signal is greater than a predetermined first threshold amplitude; and
  means responsive to said threshold output signal for complementing the $M^{th}$ bit in each of said first and second converting means, wherein the M least significant bits of said first and second sets of digital signals are converted into related first and second analog signals.

7. The system defined by claim 6, further including second threshold means responsive to said positioning signal for producing a difference limit signal whenever the absolute amplitude of said positioning signal is greater than an amplitude related to a maximum allowable difference between the actual and desired positions of said element, said difference not exceeding $2^{(M-1)}$ units of length.

8. In a system wherein an element is to be positioned within N bit accuracy in response to command signals of N bit accuracy, the arrangement comprising:
  first converting means for converting M least significant bits of the command signal to a first analog signal;
  means responsive to the position of the element for providing a position signal of N bit accuracy;
  second converting means for converting M least significant bits of the position signal to a second analog signal;
  comparing means for producing an error signal whose value is a function of the instantaneous difference between said first and second analog signals;
  means responsive to said error signal for positioning said element so that the value of said error signal is substantially reduced to zero; and
  means responsive to the error signal for complementing the maximum one of the M bits in each of said first and second converting means such that the value of the error signal is maintained at less than half the maximum possible value of either said first or second analog signals.

9. The arrangement defined by claim 8, wherein N is a function of the range over which said element is to be positioned and the unit length within which positioning is to occur.

* * * * *